US007886197B2

(12) United States Patent
Wegman

(10) Patent No.: US 7,886,197 B2
(45) Date of Patent: Feb. 8, 2011

(54) SYSTEMS AND METHODS FOR PROTECTING DEVICE FROM CHANGE DUE TO QUALITY OF REPLACEABLE COMPONENTS

(75) Inventor: Paul Wegman, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 425 days.

(21) Appl. No.: 11/762,837

(22) Filed: Jun. 14, 2007

(65) Prior Publication Data

US 2008/0310070 A1 Dec. 18, 2008

(51) Int. Cl.
*G06F 11/00* (2006.01)

(52) U.S. Cl. .......................................... 714/44; 347/19

(58) Field of Classification Search .................... 714/44
See application file for complete search history.

(56) References Cited

U.S. PATENT DOCUMENTS 6,219,153 B1 * 4/2001 Kawanabe et al. ......... 358/1.16
6,351,618 B1 * 2/2002 Pollocks, Jr. ................. 399/12
6,351,621 B1 2/2002 Richards et al.
6,678,482 B2 * 1/2004 Masuda et al. ................ 399/12
6,879,206 B2 * 4/2005 Mayer et al. ................ 327/525
6,886,902 B2 * 5/2005 Scardovi ...................... 347/19
7,231,153 B2 * 6/2007 May ............................ 399/25
2005/0248895 A1 * 11/2005 MacLean et al. ............ 361/103
2006/0012625 A1 * 1/2006 Huang ......................... 347/19

* cited by examiner

*Primary Examiner*—Scott T Baderman
*Assistant Examiner*—Kamini Patel
(74) *Attorney, Agent, or Firm*—Oliff & Berridge, PLC

(57) ABSTRACT

A device protection system for a device that operates using a replaceable component provided with a replaceable component, component monitor, and a means for disabling the replaceable component. The component monitor is provided with a storage unit, a sensing unit, a determination unit and a control unit that engages a disabling device for rendering the replaceable component inoperable in, or incompatible with, a device within which the replaceable component is intended to operate such as, an image forming device. In particular, the component monitors the temperature of an environment relating to the replaceable component that if exceeded, will affect performance of the replaceable component. The component will disable the disabling unit to protect the device.

25 Claims, 2 Drawing Sheets

SYSTEMS AND METHODS FOR PROTECTING DEVICE FROM CHANGE DUE TO QUALITY OF REPLACEABLE COMPONENTS

BACKGROUND

This disclosure is directed to systems and methods for monitoring the status of at least one variable characteristic of replaceable components and determining quality of the replaceable components.

Many devices in common use today include replaceable components. These replaceable components often include attached monitoring units that are externally and/or remotely electronically-readable for monitoring one or more characteristics regarding the replaceable components. Such characteristics can include static information, i.e., information that does not change over the life of the component, such as a model or serial number for the replaceable component. The monitoring unit can also be used to record, in an electronically-readable format, dynamic information relating to a particular characteristic of the replaceable component, which may change over time. Such dynamic information includes, for example, information on use, maintenance, failures, diagnostics, remanufacture and/or a remaining service life.

These monitoring units are often physically attached to the replaceable components with which they are associated. The monitoring units are then connected, via wired or wireless connection, for data exchange and monitoring with the device in which the replaceable component is installed. Monitoring of the device includes a capability to read the monitoring unit, and to analyze, store, and display the information read from the monitoring unit. Display may occur, for example, via a graphical user interface (GUI) associated with, or as a component of, the device in which the replaceable component is installed. An intent of providing such a capability is to facilitate a customer, end-user, field-service representative or other individual available and capable of monitoring, removing and replacing the replaceable component being alerted to a need to accomplish such replacement or other service. Preferably, such individual may advantageously be alerted early to pending exhaustion, failure or other service requirement that will define a need for replacement in the near future based on information such as, for example, uses of, or remaining service life in, the individual replaceable component. Appropriately employing this information, however, requires that an individual assess the information presented on, for example, the GUI, and then respond correctly.

Despite such warning messages, however, often devices experience unanticipated shutdowns due to unrecognized or uncorrected pending or actual fault or failure conditions in one or more replaceable components. These conditions may include, for example, some signal specifying an "end of the service life" for the replaceable component or an actual physical exhaustion condition of the replaceable component. In such instances, all alerts to impending end of life or exhaustion conditions may have gone unheeded by available personnel. In other words, no corrective action was taken despite the alerts. Also, in instances, warnings, even if timely noticed, and responded to, by available personnel, come too late. Such is particularly true in a case where there is some incompatibility with, or corruption in, the replacement component.

As a specific example, consider toner cartridges in image forming devices. In the case of toner cartridges, a proper warning to personnel indicating that toner particles are corrupted, or otherwise unfit to support production or reproduction, can alert a user often after corrupted particles may have entered the image production system. Once in production, damage to the device and/or shutdown can occur. In certain industries, such shutdowns occur at a notable rate causing customers and/or other end-users to incur substantial expense in requiring expedited servicing, and/or immediately fillable orders for replacement components. Other disadvantages include loss of revenue based on an inability to produce and/or reproduce image media through lack of availability of critical replaceable components at a point and time of need. A device is taken out of service for some, possibly extended, period of time until replacement replaceable components are received and installed. This problem, of course, is not limited to components that are replaceable, as problems with these components can result in irreparable damage to components and/or systems that may not be field or user irreplaceable.

SUMMARY

It may be advantageous to provide a system and method that may lower costs by reducing the probability of device components being damaged as a result of corrupted characteristics of replaceable components that go unnoticed, or otherwise reducing the probability of critical replaceable components being unavailable at a point and/or time of need.

Any improvement in an external monitoring of a condition of replaceable components will prove increasingly advantageous. As discussed above, an external monitoring capability allows a device to monitor the condition and determine the quality of a replaceable component for beneficial purposes. Examples of devices, such as those discussed in broad terms above, which benefit now and could better benefit in the future from an ability to monitor the status of replaceable components, may include various types of electronic office equipment, particularly image forming devices, such as those disclosed in, for example, U.S. Pat. No. 6,351,621 to Richards et al. (hereinafter "Richards"), which is commonly assigned and the disclosure of which is incorporated herein in its entirety by reference.

Richards discusses replaceable components as Customer Replaceable Units ("CRUs"), which routinely include an externally electronically-readable monitoring capability, often in the form of a memory-type monitoring chip containing static information for identifying the CRU, and/or dynamic information relating to a particular CRU's operating status or character state. Dynamic information may include, for example, a fill level, number of uses expended or other indications of a condition of the replaceable component. Richards explains that when an individual CRU is installed in the disclosed modularly-designed office equipment, a communication interface is established with the electronically-readable chip as a component status monitoring unit located within, or externally mounted to, a CRU. Such a monitoring unit enables the office equipment to monitor a characteristic of the CRU by reading data from, and potentially updating the information contained by writing data to, the monitoring unit. Richards refers to such electronically-readable modules and/or chips as Customer Replaceable Unit Monitors ("CRUMs").

Richards explains that the business office device within which the CRU is installed powers, and communicates with, the CRUM through wired or wireless communication means, in order that the device is updated on at least a routine basis with the status of one or more CRUs that operate within the device. This information is often made available to a user via, for example, a GUI within, attached to, or otherwise associated with the device as either routine status information, or when, for example, remaining service life reaches a predetermined critical value, as a warning message regarding conditions such as impending system failure and/or shutdown.

Accordingly, conditions of replaceable components such as "new" or "exhausted" may be easily determinable as are a more detailed continuum of states or conditions ranging, for example, from "unused" thru "partially consumed" to "exhausted." More detailed condition monitoring yet may detect states such as, for example, "damaged" and/or "unusable." Certain of these states or conditions are monitored by "smart" component monitors such as, for example, CRUMs, in order that the component monitor "knows" something about the component's condition.

Despite the apparent ease with which certain of these determinations can be made, there may be no manner by which, without user intervention, a device in which a damaged replaceable component, or a replaceable component with damaged contents, is located may be caused to cease to function before incurring damage to the device. The device is reliant upon available personnel to interrupt, or otherwise cease function of the device in reply to some alert or warning. In many cases, it is possible that, even if personnel are on hand to respond instantaneously to alerts or warnings, by the time an alert or warning is registered, damage to the device may have already occurred.

An example of a damaging condition will now be described. It should be appreciated, however, that this exemplary description is included for illustrative purposes only and that the systems and methods according to this disclosure are not limited to correction, or to even addressing, only such limited errors and/or malfunctions. Specifically, in a case of replaceable toner cartridges, such cartridges may be damaged by "blocked" toner particles. "Blocking" may occur when toner has been or is heated either purposefully or incidentally to a point that the toner reaches a glass transition temperature (Tg) for the particular toner in use. In such instances, constituent toner particles solidify, or block, and become unusable. It should be understood that such a problem is particularly acute with low-melt toners, such as color toners. Low-melt toners have low Tg temperatures, for example, in a range from about 120° C. to about 130° C. These temperatures are common in, for example, commercial image forming devices in use. These temperatures are also easily attained under certain storage or transport conditions, as well as under other incidental use conditions. Blocked toner, when introduced into the image formation process, can result in substantial and costly damage to sensitive parts of the housing device, including, for example, damage to the photoreceptor unit.

Exemplary embodiments of systems and methods according to this disclosure address the above-described, and other, problems by implementing a commercially-viable solution to attempt to avoid damage attendant in employment of defective replaceable components. The disclosed systems and methods are intended to, among other objectives, reduce risks associated with attempting image processing with damaged replaceable components in, for example, image forming devices.

Exemplary embodiments of disclosed systems and methods may provide replaceable components with associated monitoring units such as, for example, CRUs with CRUMs. The associated monitoring unit may include a storage unit, a sensing unit, a determination unit and a control unit. The control unit may control some means for disabling the replaceable component by rendering it completely or temporarily unusable in, or incompatible with, the device within which the replaceable component is intended to operate. Examples of such disabling means may include, for example, some manner of interrupting circuit that may disable the replaceable component by way of, for example, a fusible link based on a determination made by the determination device that a defect or defective condition exists in the replaceable component.

In various exemplary embodiments of disclosed systems and methods, the storage unit may store, for instance, a predetermined maximum or minimum temperature. The sensing unit may sense, among other characteristics, an environmental temperature within which the replaceable component is stored, transported, operated or the like. The determination unit may determine whether the replaceable component remains operable based on a comparison of temperatures to which the replaceable component is exposed and the predetermined maximum or minimum temperature. On the basis of such a comparison, a disabling determination may be rendered and a disabling action affected.

Exemplary embodiments of disclosed systems and methods may provide a replaceable component housing a monitoring unit, the monitoring unit comprising a control unit which controls a circuit by way of a fusible link that is severable. The control unit which controls the circuit may include a fusible link that, when severed, renders the replaceable component inoperable.

Exemplary embodiments of disclosed systems and methods may further include a notification unit for notifying a user of a status of the replaceable component, to include, for example, that the replaceable component may have been rendered inoperable.

Exemplary embodiments of disclosed systems and methods may provide a replaceable component that is associated with an image forming device. Such a replaceable component may be a customer replaceable unit or other replaceable component associated with a xerographic image forming device. The replaceable component may be an image producing medium holding component, in which the image producing medium may be, for example, at least one of ink or toner.

These and other features and advantages of various exemplary embodiments are described in, or apparent from, the following detailed description of embodiments.

BRIEF DESCRIPTION OF THE DRAWINGS

Various exemplary embodiments of systems and methods according to this disclosure will be described, in detail, with reference to the accompanying figures, wherein.

DETAILED DESCRIPTION OF EMBODIMENTS

The following detailed description of various exemplary embodiments of systems and methods regards monitoring a condition of a replaceable component via a monitoring unit associated with that replaceable unit, includes reference to controlling operation of the replaceable component to render it temporarily or permanently unusable or incompatible with the device within which the replaceable component is intended to be used by, for example, at least severing a fusible link. Each replaceable component has at least one component monitoring unit associated with it. A CRU provides a non-limiting example of a replaceable component. Each CRU will be understood as having associated with it a CRUM as an externally-readable chip installed in, attached to, or otherwise associated with, the CRU to provide static and/or dynamic information regarding characteristics, configuration and/or other details of the CRU within or upon which the CRUM is installed, or with which the CRUM is associated. However, the principles disclosed and described regarding the exemplary embodiments in this disclosure are applicable to substantially any system or method that monitors characteristics of an end-user, or otherwise on-site, replaceable component for a device, particularly of modular design, in virtually any application where an on-hand supply of replaceable components is advantageously optimized, i.e., to reduce a necessary on-hand supply, or the like. The externally-readable monitoring devices contemplated are those that are generally designed to provide static and/or dynamic information regarding characteristics of the replaceable components with which they are associated in order that a control unit may be advantageously employed to monitor, report or control the condition of the replaceable component.

Figure 1:
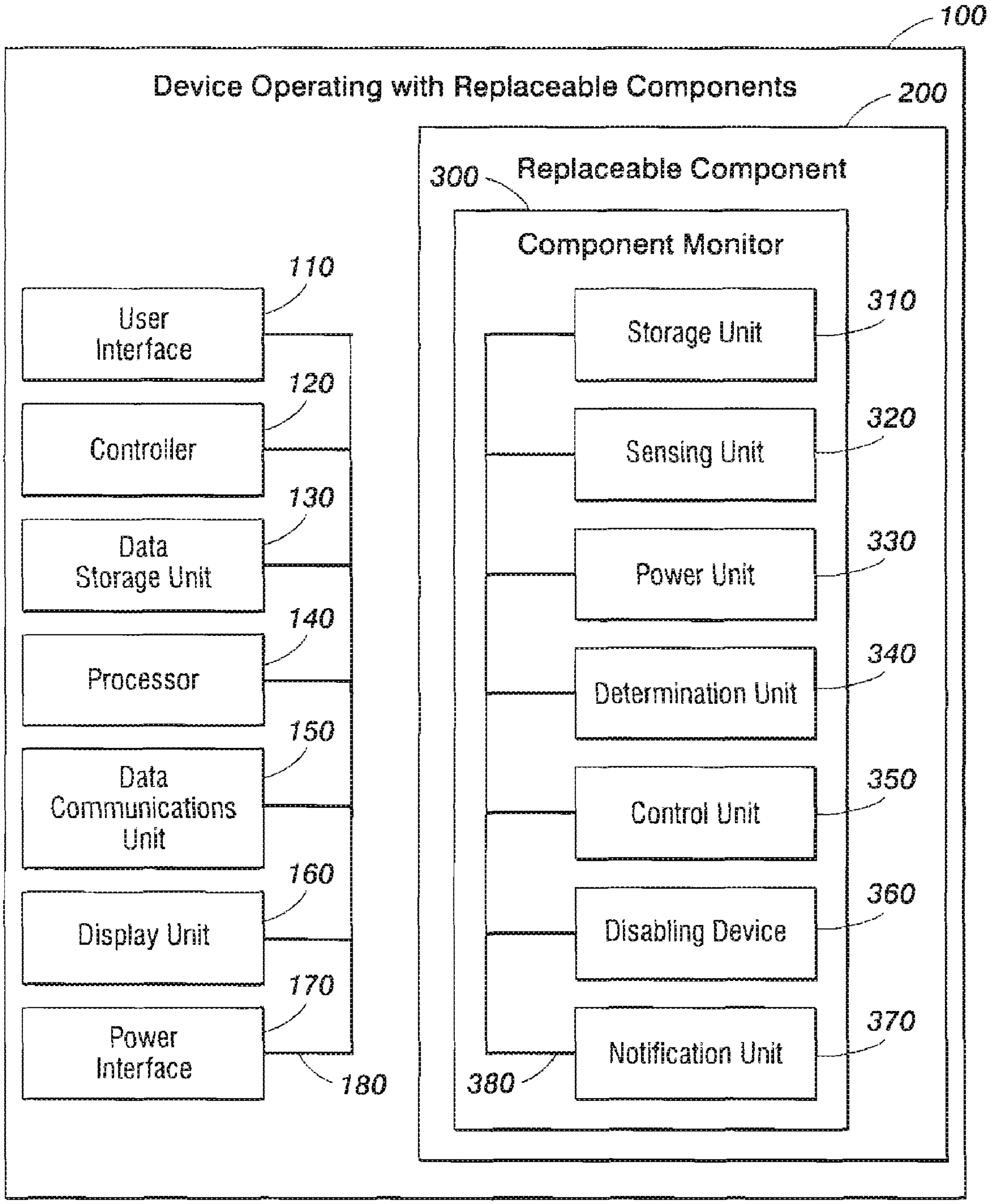
FIG. 1 illustrates a functional block diagram of a structure of an exemplary device protection system according to this disclosure.

FIG. 1 illustrates a functional block diagram of a structure of an exemplary device protection system for a device operating with replaceable components 100. As shown in FIG. 1, the exemplary device operating with replaceable components 100 may include a user interface 110, a controller 120, a data storage unit 130, a processor 140, a data communications interface 150, a display unit 160, and a power interface 170, all interconnected with one or more data and control buses 180.

The user interface 110 and the display unit 160 may be individual components or they may be a combined component such as, for example, a graphical user interface. The user interface 110 may afford a user an opportunity to specifically query a monitoring unit within, attached to, or otherwise associated with, one or more other replaceable components with which the device operates. When querying, the monitoring unit may provide information via the data communications interface 150 to the device 100 to be displayed on the display unit 160. The controller 120 may be provided separate from, or in conjunction with, the processor 140 to process information and control the operation of the device. One or more data storage units 130 may be provided to store operating parameters regarding the device and/or one or more replaceable components to be employed by the device. Characteristic information, for example, regarding status quo dynamic characteristics of one or more replaceable components 200 may be made available via the data storage unit 130 in order to reduce any need for data storage within the replaceable component, or the component monitor associated with the replaceable component. A power interface 170 may be provided to be a wired or wireless main power of at least the component monitor 300 associated with one or more replaceable components 200 in the device.

The replaceable component 200 within the device 100 may advantageously include at least one component monitor 300. As shown in FIG. 1, the component monitor 300 may include a storage unit 310, a sensing unit 320, a power unit 330, a determination unit 340, a control unit 350, a disabling device 360, and a notification unit 370, one or more of these units being connected via some manner of data/control bus 380 within the component monitor.

It should be recognized that the component monitor may be housed within, attached to an inside or outside base of, or otherwise associated with, and in data communication with, the replaceable component. As will be discussed in greater detail below, for example, only a sensing unit 320 may be actually attached to the replaceable component 200 when it is a specific characteristic of the replaceable component 200 which physical attachment of a sensing unit 320 may facilitate measuring. It should be further appreciated that one or more of the units and/or devices depicted as parts of the component monitor 300 may be in communication with one or more components within the device via, for example, the data communications interface 150 in the device which may exchange information directly with one or more of the units of the component monitor. The component monitor may be further augmented with its own data communications interface (not shown) to be made compatible with the data communications interface 150 in the device.

The storage unit 310 of the component monitor 300 may store, for example, status quo dynamic information regarding characteristics of the replaceable component 200 with which the component monitor 300 is associated. Such status quo characteristics, as indicated above, may include serial and/or model numbers and/or any other characteristic information regarding the replaceable component 200 that does not change over time, and therefore does not need to be necessarily updated. Such static information may be read via the data communications interface 150 of the device 100 in order to, for example, ensure compatibility between the replaceable component 200 and the device 100. As will be described in more detail below, one manner by which, for example, the replaceable component may be "disabled" is to modify such static information regarding compatibility in order that the device 100 may not recognize the replaceable component 200 as being compatible with operation of the device 100.

The storage unit 310 may also store dynamic information regarding characteristics of the replaceable component 200. Such dynamic characteristics, as indicated above, may include, for example, a number of uses expended, estimated service life remaining and/or fill levels for material housed within the replaceable component. Other characteristics of the replaceable component that may be sensed and modified over time may also be updated in the storage unit in order that the device may be made "aware" of a continually updated status of the replaceable component 200 via communication with the component monitor 300.

A sensing unit 320 maybe provided to sense one or more characteristics of the replaceable component 200. These characteristics may be those associated specifically with the replaceable component 200, or otherwise regarding an environment within which the replaceable component 200 is stored, transported and/or operated. For example, in cases where a replaceable component may be adversely affected by environmental conditions such as, for example, temperature or humidity, such a sensor 320 may be provided to sense environmental conditions surrounding, within, or otherwise associated with, the replaceable component 200. Data gathered by the sensor may be employed by one or more of the units within the component monitor 300 or may be transmitted directly to the device 100 in order that calculation and/or determinations may be undertaken regarding whether the replaceable component 200 may remain effective, or otherwise have been damaged, by exposure to one or more adverse environmental conditions.

The component monitor 300 may be independently powered by some manner of power unit 330 such as, for example, a battery or photovoltaic cell attached directly to the component monitor, or attached to the replaceable component 200 outside the component monitor 300. Alternatively power may be provided via the power unit 330 to the component monitor 300 by some form of wired or wireless power interface 170 that may cooperate with the power unit 330 and the component monitor 300 to power the component monitor 300.

A determination unit 340 may be provided within the component monitor 300 to constantly, or periodically, assess a condition of the replaceable component 200 with which the component monitor 300 is associated based on stored, stored-updated, or sensed characteristic information from one or more of the storage unit 310 or sensing unit 320 associated with the component monitor 300 or otherwise with information provided from the device via, for example, the data communications interface 150 based on information stored in the data storage unit 130. An objective of the determinations is to decide whether, based on an appropriate combination of inputs from one or more of the above-discussed sources, that the replaceable component 200 may no longer be compatible with the device 100 within which the replaceable component is intended to operate. Such conditions may include those which may go unrecognized and yet should the device 100 attempt to operate with the replaceable component 200 in such a condition, damage to the device 100 may occur.

A control unit 350 may be provided to execute some manner by which to disable, or otherwise render incompatible, the replaceable component 200 based on information gathered from, or otherwise calculated by, the component monitor 300 in order to attempt to prevent damage to the device 100. As discussed briefly above, the control unit 350 may, for example, halt static identification information associated with the replaceable component 200 that establishes compatibility with the device 100 in order that the device 100 may then recognize the replaceable component 200 as being incompatible with the device 100 and therefore not employ the replaceable component 200. In such an instance, for example, a user may be alerted to such a condition by a user interface 110, or a display unit 160, on the device 100. In an exemplary embodiment, with operation of the device 100 interrupted by such a system, user intervention may be required to replace the incompatible replaceable component 200 and to, for example, reset the device 100 operating with the replaced replaceable component 200 via some input through, for example, the user interface 110.

The control unit 350 of the component monitor 300 may separately activate some form of disabling device 360. Such a disabling device 360 may, for example, physically alter the replaceable component 200 in a manner to render the replaceable component 200 inoperable by the device 100. An example of such a disabling device may be some manner of separable fusible link that may be activated by, for example, the control unit 350 directly, or if certain of the determinations and control elements are those housed within the device itself, may be activated, for example, by the controller 120 with data transferred via the data communications interface 150 to the control unit 350 to activate the disabling device. In the case in which the disabling device 350 comprises, for example, some sort of severable fusible link, such link may be in place in any manner that once severed will result in rendering the replaceable component 200 at least temporarily inoperable within the device 100. In this manner, an objective is to reduce, and/or otherwise eliminate, the likelihood of damage to the device 100 by the device 100 attempting to operate a replaceable component that has been subject to some manner of characteristic failure.

A notification unit 370 may be provided directly within the component monitor 300 to provide some indication of, for example, the replaceable component 200 having been rendered incompatible or otherwise inoperable by internal components of the component monitor 300 or by one or more components of the component monitor 300 in communication with components within the device 100. Such notification may be local to the component monitor 300, shown in some manner on the replaceable component 200 itself, or transmitted, for example, by the data communication interface 150 in the device 100 to either the user interface 110 or the display unit 160 of the device 100 in order that all manners of alerting a user, or maintenance personnel, to a rendering of the replaceable component incompatible with, and/or inoperable within, the device, may be made.

A specific example of how the interrelated components discussed above may be employed includes in a particular exemplary embodiment of the disclosed device 100, the data storage unit 130 or the storage unit 310 may store data regarding at least one of a maximum, minimum or otherwise threshold temperature or temperature range. If these temperatures are equaled, exceeded or otherwise referenced as evidenced by some sensor, including but not limited to the sensing unit 320 of the component unit 300, there may be a resultant direct or indirect effect upon the replaceable component 200. If this resultant effect may be damaging to the device 100 associated with the replaceable component 200 control components such as the controller 120 or the control unit 350 may provide for engagement or activation of the disabling device 360.

Exemplary embodiments of the disclosed system may provide a monitoring unit that includes a sensing unit 320 that may read and write data regarding a characteristic of the replaceable component 200. For example, the sensing unit 320 may measure, store, access, or the like, characteristics directly or indirectly from the replaceable component 200 regarding at least one of an environment around the replaceable component 200 or the replaceable component 200 itself. In particular, the sensing unit 320 may sense the temperature of a medium such as, for example, toner or ink in the replaceable component 200 on a real-time basis. The disclosed system is not limited to sensing conditions relating specifically to temperature and may sense any conditions within the replaceable component 200 or device 100, or conditions outside the replaceable component 200 or device 100 such as, for example, environmental conditions in a warehouse or shipping unit. The sensing unit 320 may measure conditions by direct electronic means but may also measure electronically from indirect mechanical sensing devices. The sensing unit 320 may have a dynamic structure and, for example, be responsive to programming commands or input from an external source such as, for example, the device 100 via the data communications interface 150.

Exemplary embodiments of the disclosed system may provide the component monitor 300 with a determination unit 340 that may compare data in the storage unit 310 with data from the sensing unit 320. In particular, the determination unit 340 may compare the data based on the characteristics of the replaceable component 200 and determine, based on that comparison, whether the replaceable component 200 should be disabled. The determination unit 340 may provide for any means of comparison such as, for example, a threshold comparison between data relating to a predetermined temperature setting and data relating to current conditions of a medium within a replaceable component 200. In particular, the determining unit 340 may determine whether a temperature sensed from a replaceable component 200 exceeds a predetermined or otherwise determined maximum or minimum temperature setting characteristic of that replaceable component 200. In exemplary embodiments, if the temperature exceeds a threshold value, operation of the replaceable component may be made to cease or may be modified by way of disabling device 360. Of course, the determination unit 340 is not limited by this means of comparison and may have the processing capacity commensurate with that known in the art, including the capacity to execute algorithms based on any combination of predetermined settings, real-time readings or preexisting programming code.

Exemplary embodiments of the disclosed system may provide a component monitor 300 that includes a control unit 350 that may communicate with the determination unit 340, the disabling device 360, the replaceable component 200, and device 100 via the data communications interface 150. The control unit 350 processes the determination of the determination unit 340 and may format a signal from the determination unit 340 to communicate with the device 100 for further processing. In particular, the control unit 350 may process the determination and engage the disabling device 360 directly. Based on the determination, the control unit may not send a signal at all, send a signal to continue normal operation and/or send a signal varying the operational status of the replaceable component 200 to, for example, cease function of the replaceable component 200 by rendering it inoperable or incompatible with the device 100. The control unit 350 is not limited to communicating with the disabling device 360 and may communicate directly with specific components of the device 100.

Exemplary embodiments of the disclosed system may provide a disabling device 360 to render the replaceable component 200 at least one of inoperable for use in the device 100 and/or incompatible with the device 100 based on the monitored characteristic of the replaceable component 200. In embodiments, the control unit 350 may engage the disabling device 360 based on the determination from the determination unit 340 and, based on that engagement, the control unit 350 may signal the disabling device 360 to activate, for example, a severable fusible link circuit in the disabling device 360. The disabling device 360 may be housed within the component monitor 300 itself, or contained within or attached to the replaceable component 200 or otherwise associated with the replaceable component 200 in a manner that allows the disabling device to engage the severable fusible link circuit, or to otherwise render the replaceable component 200 incompatible with, or inoperable within, the device 100. The disabling device 360 may also be provided with means for communicating with the device 100 itself independently of, or in conjunction with, the component monitor 300. In embodiments, the disabling device 360 may be a circuit itself, such as a fusible link circuit, the activation of which, renders the replaceable component 300 at least one of inoperable for use or incompatible with associated device 100.

Exemplary embodiments of the disclosed system may provide within the component monitor 300, a notification unit 370 that outputs a status of the component monitor 300, or the replaceable component 200. The notification unit 370 may display the status of any one of the exemplary units of the component monitor 300 itself or the replaceable component 200 such as, for example, the determination of the determination unit 340, the status of the disabling device 360, the operational status of the replaceable component 200, the nature of communication from the device 100 or the like. In particular, the notification unit 370 may alert or warn personnel that the replaceable component 200 is inoperable. However, the notification unit is not limited to this capacity and may provide alerts, warning or tips relating to any condition of the replaceable component 200, device 100 and/or the component monitor 300 itself, independently, or in operation with, any of the other components.

It should be appreciated that, given the required inputs, software algorithms, hardware/firmware circuits, or any combination of software and hardware/firmware control elements may be used to implement the individual devices and/or units depicted.

It should be appreciated that although depicted as individual devices in FIG. 1, any combination of the devices and/or units depicted may be combined where functionalities may be compatible. Further, although the elements may be depicted as housed within a single exemplary device 100, it should be appreciated that one or more of the capabilities and/or functionalities defined with regard to the depicted devices and/or units may be advantageously provided remotely from the specific device 100. When such remote operation is undertaken, any manner by which the individual remotely-located units, devices and/or functionalities may be implemented through some form of wired and/or wireless data communication exchange with the image device is contemplated.

Any static storage unit described above may be implemented by any appropriate combination of alterable, volatile or nonvolatile memory, or non-alterable, or fixed, memory. The alterable memory, whether volatile or non-volatile, may be implemented by using any one or more of static or dynamic RAM, a computer disk and compatible disk drive, a writeable or re-writeable optical disk and associated disk drive, a hard drive, a flash memory, a hardware circuit, a firmware circuit, or any other like memory medium and/or device. Similarly, the non-alterable, or fixed, memory may be implemented using any one or more or ROM type memory, optical ROM disks with compatible disks readers, or any other like memory storage medium and/or device.

Figure 2:
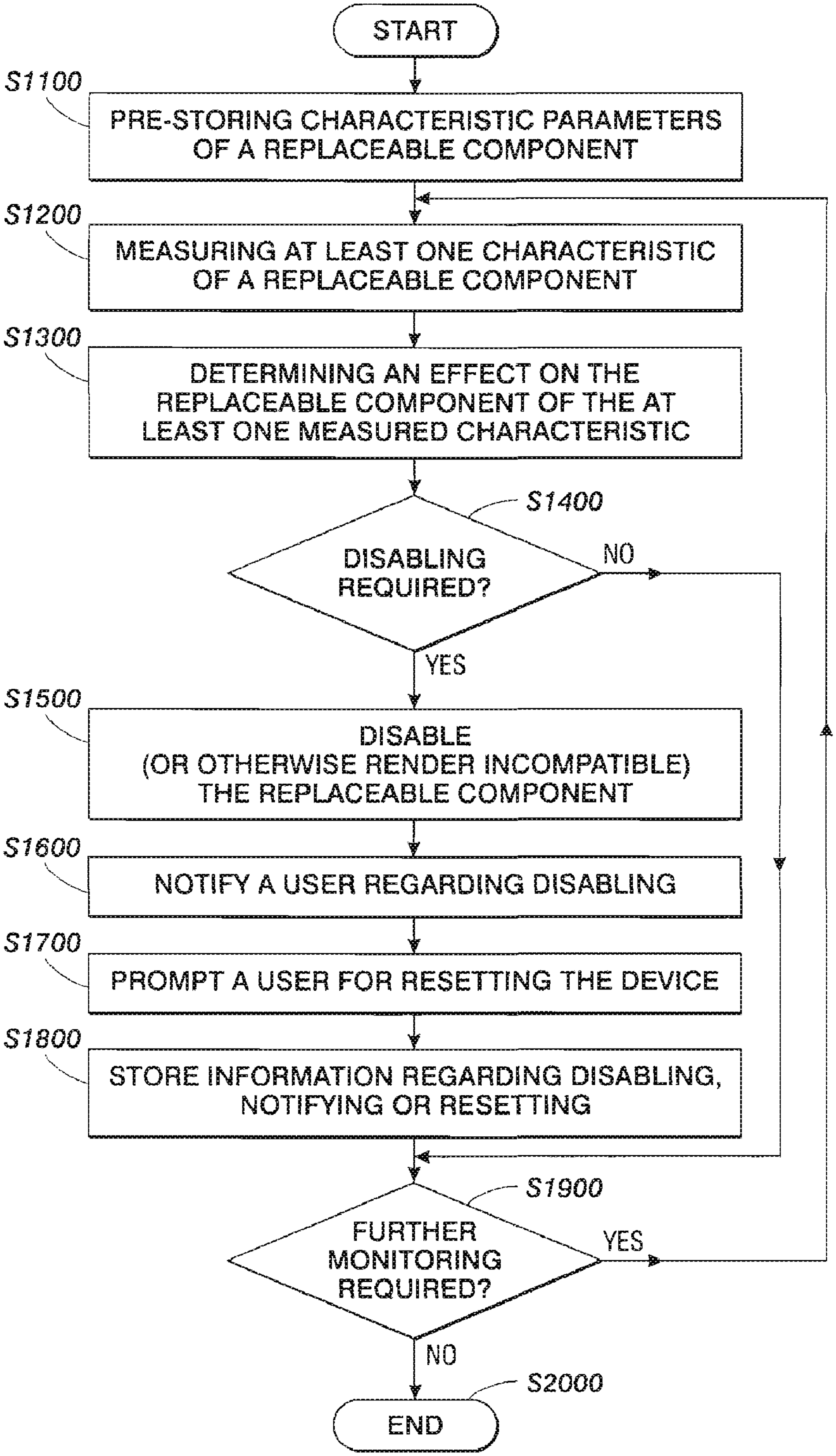
FIG. 2 illustrates a flowchart of an exemplary method for monitoring a replaceable component for device protection according to this disclosure.

FIG. 2 illustrates a flowchart of an exemplary method for monitoring a replaceable component for device protection. As shown in FIG. 2, operation of the method commences at step S1000 and proceeds directly to step S1200 or optimally to step S1100.

In optional step S1100, characteristic parameters of a replaceable component may be pre-stored either in a component monitoring unit associated with a replaceable component, or in a device within which the replaceable component is intended to be operated. Such pre-stored characteristic parameters may include static or dynamic information related to the replaceable component that the component monitor or device can advantageously use to measure one or more characteristic parameters of the replaceable component for comparison. Operation of the method continues to step S1200.

In step S1200, at least one characteristic related to a replaceable component is measured. Such measuring can include, for example, internally measuring a characteristic of the replaceable component via some sensing device, or separately, for example, sensing an environment within which the replaceable component is stored, transported and/or operated. Such a sensing unit may be provided on an internal or external surface of the replaceable component, attached to any surface of the replaceable component or may otherwise be associated with the replaceable component. The sensing unit may inform the component monitor regarding the measurement of the at least one characteristic for further processing within the component monitor, or in the device within which the replaceable component is intended to be operated. Such characteristics may include, but are not limited to, environmental considerations within or around the replaceable components such as, for example, temperature and/or humidity; and information about the replaceable component itself, such as, for example, a number of uses, a fill level, and/or some other metric associated with an end of service life determination for the replaceable component. Operation of the method continues to step S1300.

In step S1300, a determination is made regarding an effect on the replaceable component of the at least one measured characteristic. Such determination may include, for example, predicting an end of life of the replaceable component or otherwise determining that, for example, the replaceable component may have been adversely affected by one or more environmental considerations to which the replaceable component has been exposed. Operation of the method continues to determination step S1400.

In determination step S1400, a determination is made whether based on the information regarding an effect of the measured at least one characteristic on the replaceable component the replaceable component should be disabled. Such disabling may be temporary or permanent. Such disabling may also render the replaceable component in some manner incompatible with the device within which the replaceable component is intended to be operated.

Alternatively, the disabling may render inoperable the replaceable component.

If, in step S1400, a determination is made that disabling is not required operation of the method continues directly to step S1900.

If, in step S1400, a determination is made that disabling is required, operation of the method continues to step S1500.

In step S1500, the replaceable component is rendered incompatible with, or inoperable within, the device within which the replaceable component is intended to be operated. Such disabling may include, for example, modifying the static information stored in a storage unit of a component monitor in order that the device within which the replaceable component is intended to be operated does not recognize the replaceable component as being compatible for operation within the device. Alternatively, the disabling may include activation of some disabling device that renders inoperable the replaceable component by, for example, rendering inoperable any communications and/or compatibility link between the replaceable component and the device within which the replaceable component is intended to be operated. In such an instance, for example, a severable fusible link may be employed which upon determining that disabling is required, the component monitor, through a control unit within the component monitor, or otherwise, activates the severable fusible link in order to render inoperable the replaceable component. It should be recognized that any manner by which the replaceable component may be rendered incompatible and/or inoperable to the device within which the replaceable component is intended to be operated is contemplated. For example, activation of some device which physically alters the replaceable component in a manner that renders it even incapable of being installed within, or otherwise incapable of being operated once installed within, a device may be employed. Operation of the method continues directly to step S1900 or optionally to one or more of steps S1600, S1700 or S1800.

In optional step S1600, a user of a device or of a replaceable component may be notified via some manner of display on the replaceable component, on a component monitor associated with a replaceable component, or on the device within which the replaceable component was intended to be operated, of a disabling of the replaceable component. Operation of the method continues directly to step S1900 or to one or more of optional steps S1700 or S1800.

In step S1700, as part of a notification in step S1600, or separately, a user may be prompted to reset the device. Such reset may include, but not be limited to, replacing the replaceable component, checking the replaceable component to determine visually or otherwise whether the replaceable component is, in fact, detective, or by resetting the device within which the replaceable component is intended to be operated. Operation of the method continues directly to step S1900 or optionally to step S1800.

In optional step S1800, information regarding the measured characteristic, the determination of the effect on the replaceable component, the disabling decision, notification, resetting or other like information may be optionally stored to some beneficial purpose. Such beneficial purpose may include, but not be limited to, later reviewing fault information regarding one or more replaceable components or, for example, trend analysis and/or inventory control. Operation of the method continues to step S1900.

In step S1900, a determination is made whether further monitoring is required.

If, in step S1900, a determination is made that further monitoring is required, operation of the method reverts to step S1200.

If, in step S1900, a determination is made that further monitoring is not required, operation of the method continues to step S2000 where operation of the method ceases.

It should be appreciated that the measuring step, step S1200, may include any manner of sensing. Such sensing may include but not be limited to any one or more of the following.

Sensing may provide measuring, storing, accessing, or the like. Sensing may, for example, measure directly or indirectly from the replaceable component the temperature of a medium such as, for example, toner or ink within the replaceable component. The disclosed method is not limited to sensing conditions relating specifically to temperature and may provide for sensing of any conditions within the replaceable component or device within which the replaceable component is intended to be operated, or conditions outside the replaceable component or device such as, for example, environmental conditions in a warehouse or shipping unit. Sensing may involve coordination with external commands or inputs, such as from the device or a user.

It should be expected that determining an effect on the replaceable component (step S1300) may be undertaken, for example, by comparing the results of information regarding the replaceable component stored in a storage unit with the results of sensing undertaken by some form of sensor unit as discussed above. In particular embodiments, step S1300 determines whether a minimum or maximum temperature has been equaled, exceeded and/or otherwise referenced. It is based on such a determination whether the replaceable component should be disabled. Determining an effect may provide for any methodology of processing data such as, for example, comparing values or executing algorithms. In particular, step S1300 may provide for determining whether a temperature sensed from a replaceable component exceeds a predetermined minimum or maximum temperature setting for that replaceable component.

Of note, step S1600 may involve resetting or modifying any determined or predetermined settings. In particular, resetting may provide for, for example, overriding or modifying actions of the control unit. Resetting may also provide other user or device initiated modification to the disclosed method.

In exemplary embodiments, the device within which the above method is implemented may be an image forming device, such as, for example, a xerographic image forming device. However, it should be appreciated that, while disclosed systems and methods may have been described with exemplary replaceable components that are associated with certain business office devices in mind, systems and methods according to this disclosure are not limited to such applications, but may be applied to any operating situation where it would be advantageous to monitor the supply and internal status of on-hand replaceable components in storage or operation.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A device protection system for a device that operates using one or more replaceable components comprising:

a replaceable component that is accommodated by a device; and a monitoring unit associated with the replaceable component that monitors at least one characteristic of the replaceable component;

a disabling device that prevents operation of the replaceable component in the device and makes the replaceable component incompatible with the device based on the monitored at least one characteristic of the replaceable component.

2. The system of claim 1, wherein the monitoring unit further comprises:

a sensing unit that senses the at least one characteristic of the replaceable component;

a storage unit that stores data regarding the at least one characteristic;

a determination unit that compares the sensed at least one characteristic to stored data regarding the at least one characteristic and determines that, based on the comparison, the replaceable component should be disabled; and a control unit that, based on the determination, engages the disabling device, and wherein the monitoring unit is a CRUM.

3. The system of claim 2, wherein at least one of the sensing unit, the storage unit, the determination unit or the control unit is located within the device, the monitoring unit communicating with the at least one unit via a data interface.

4. The system of claim 2, wherein the sensed at least one characteristic is a temperature to which the replaceable component has been exposed, the storage unit stores data regarding at least one of a maximum or minimum temperature that, if exceeded, will affect the replaceable component in a manner that employment of the replaceable component by the device will damage the device, the sensing unit senses a temperature of at least one of an environment around the replaceable component or of the replaceable component itself, and the determination unit determines whether the replaceable component should be disabled based on the at least one of the maximum or minimum temperature being exceeded.

5. The system of claim 1, wherein the disabling device is a fusible link circuit.

6. The system of claim 2, wherein the disabling device is a fusible link circuit and the control unit controls the fusible link circuit based on a determination made by the determination unit.

7. The system of claim 6, wherein a fusible link in the fusible link circuit is severable.

8. The system of claim 1, further comprising a notification unit for displaying a status of the replaceable component.

9. The system of claim 1, wherein the replaceable component is a customer replaceable unit associated with a xerographic image forming device.

10. The system of claim 9, wherein the customer replaceable unit is an image producing medium holding component.

11. The system of claim 10, wherein the image producing medium holding component holds at least one of ink or toner.

12. The system of claim 1, wherein the monitoring module is at least one of housed within or attached directly to the replaceable component.

13. A method for protecting a device that operates using one or more replaceable components comprising:

monitoring at least one characteristics of a replaceable component employed by a device with a monitoring module associated with the replaceable component; and disabling that prevents operation of the replaceable component in the device and makes the replaceable component incompatible with the device based on the monitored at least one characteristic of the replaceable component.

14. The method of claim 13, wherein the monitoring further comprises:

sensing the at least one characteristic of the replaceable component;

comparing the sensed at least one characteristic to stored data regarding the at least one characteristic;

determining that the replaceable component should be disabled based on the comparison; and activating the disabling device based on the determination, wherein the monitoring module is a CRUM.

15. The method of claim 14, wherein at least one of the sensing, comparing, determining and activating occurs in the monitoring module.

16. The method of claim 15, wherein the monitoring module is at least one of housed within or attached to the replaceable component.

17. The method of claim 14, wherein at least one of the sensing, comparing, determining and activating occurs within the device, the monitoring module communicating with the device via a data interface.

18. The method of claim 14, wherein the sensed at least one characteristic is a temperature to which the replaceable component has been exposed, the stored data regards at least one of a maximum or minimum temperature that, if exceeded, will affect the replaceable component in a manner that employment of the replaceable component by the device will damage the device, a temperature of at least one of an environment around the replaceable component or of the replaceable component itself is sensed, and the comparison is between the sensed temperature data and the stored temperature data, the determining being whether the replaceable component should be disabled based on the at least one of the maximum or minimum temperature being exceeded.

19. The method of claim 13, wherein the disabling occurs by engaging a fusible link circuit.

20. The method of claim 14, wherein the disabling occurs by engaging a fusible link circuit and the disabling device is activated by severing a fusible link in the fusible link circuit.

21. The method of claim 13, further comprising displaying a status of the replaceable component.

22. The method of claim 13, wherein the replaceable component is a customer replaceable unit associated with a xerographic image forming device.

23. The method of claim 22, wherein the customer replaceable unit is an image producing medium holding component.

24. The method of claim 23, wherein the image producing medium holding component holds at least one of ink or toner.

25. A computer-readable data storage medium on which is stored a program for causing a computer associated with an image forming device to execute a disabling according to claim 13.

* * * * *